(12) United States Patent
Kakuchi et al.

(10) Patent No.: US 12,288,468 B2
(45) Date of Patent: Apr. 29, 2025

(54) TAXICAB SYSTEM FOR COORDINATING TAXICAB VEHICLES TO ACCOMMODATE GROUPS OF RIDERS

(71) Applicant: TOYOTA JIDOSHA KABUSHIKI KAISHA, Toyota (JP)

(72) Inventors: Makoto Kakuchi, Toyota (JP); Osamu Izumida, Nagoya (JP); Shunji Inoue, Okazaki (JP); Takumi Hamajima, Takatsuki (JP); Mitsushi Kintaka, Kariya (JP); Toshihiro Andou, Kariya (JP); Masamitsu Takahira, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 314 days.

(21) Appl. No.: 17/659,358

(22) Filed: Apr. 15, 2022

(65) Prior Publication Data

US 2022/0335833 A1 Oct. 20, 2022

(30) Foreign Application Priority Data

Apr. 19, 2021 (JP) .................................. 2021-070568

(51) Int. Cl.
*B60W 30/165* (2020.01)
*B60W 60/00* (2020.01)
(Continued)

(52) U.S. Cl.
CPC .......... *G08G 1/202* (2013.01); *B60W 30/165* (2013.01); *B60W 60/00253* (2020.02); *G05D 1/0293* (2013.01); *G06Q 50/40* (2024.01); *G06V 20/593* (2022.01); *G07B 15/02* (2013.01); *G08G 1/22* (2013.01)

(58) Field of Classification Search
CPC ... G08G 1/202; G08G 1/22; B60W 60/00253; B60W 30/165; G06V 20/593; G06Q 50/40; G05D 1/0293
See application file for complete search history.

(56) References Cited

U.S. PATENT DOCUMENTS

2019/0213513 A1* 7/2019 Seacat DeLuca .... G06Q 20/322
2019/0380005 A1* 12/2019 Eashwaramoorthy .. H04W 4/08
(Continued)

FOREIGN PATENT DOCUMENTS

CN 109886440 A 6/2019
CN 112348216 A 2/2021
(Continued)

*Primary Examiner* — Jess Whittington
*Assistant Examiner* — Rami Nabih Bedewi
(74) *Attorney, Agent, or Firm* — SoraIP, Inc.

(57) ABSTRACT

A taxicab system includes a plurality of taxicab vehicles which are all autonomous vehicles, and a management device. Each taxicab vehicle can form a vehicle group with other taxicab vehicles according to an instruction from a customer or the management device. The vehicle group includes one representative vehicle and at least one subordinate vehicle. The representative vehicle and the subordinate vehicle execute at least one of a collective billing process for charging a representative customer a fare for each of the plurality of vehicles, and a collective setting process for setting a place designated by the representative customer as a destination of each of the vehicles.

10 Claims, 13 Drawing Sheets

(51) Int. Cl.
   *G05D 1/00*      (2006.01)
   *G06Q 50/40*     (2024.01)
   *G06V 20/59*     (2022.01)
   *G07B 13/04*     (2006.01)
   *G07B 15/02*     (2011.01)
   *G08G 1/00*      (2006.01)

(56)                References Cited

U.S. PATENT DOCUMENTS

2020/0057453  A1*  2/2020  Laws .................. G05D 1/0088
2020/0242518  A1*  7/2020  Nakamura ............. G06Q 10/02
2021/0110720  A1*  4/2021  Bang ................... G05D 1/0293
2022/0068139  A1*  3/2022  Brandon ............... G05D 1/695

FOREIGN PATENT DOCUMENTS

| JP | 2003-099892 A | 4/2003 |
| JP | 2003-308596 A | 10/2003 |
| JP | 2017-174208 A | 9/2017 |
| JP | 2018-097514 A | 6/2018 |
| JP | 2020-119370 A | 8/2020 |
| JP | 2020-119441 A | 8/2020 |
| JP | 2021-047881 A | 3/2021 |

\* cited by examiner

TAXICAB SYSTEM FOR COORDINATING TAXICAB VEHICLES TO ACCOMMODATE GROUPS OF RIDERS

CROSS-REFERENCE TO RELATED APPLICATION

This application claims priority to Japanese Patent Application No. 2021-070568 filed on Apr. 19, 2021, incorporated herein by reference in its entirety.

BACKGROUND

1. Technical Field

The present specification discloses a taxicab system including a plurality of taxicab vehicles that transport a customer to a destination by automatic driving without a driver on board, and a management device that manages the plurality of taxicab vehicles.

2. Description of Related Art

It has been proposed to use an autonomous vehicle as a taxicab vehicle. For example, Japanese Unexamined Patent Application Publication No. 2017-174208 discloses a system for providing a taxi service using autonomous vehicles.

SUMMARY

The customer sets a destination when they start traveling in the autonomous taxicab vehicle, and pays a fare when they alight from the taxicab vehicle. Destination setting and fare payment are usually processed separately for each taxicab vehicle. Therefore, the customer, while they are traveling in a taxicab vehicle, cannot set a destination for another taxicab vehicle or pay a fare for another taxicab vehicle. In a case where multiple customers move as a group, it is necessary to set the destination and pay the fare for each taxicab vehicle separately, thus causing inconvenience.

Assuming that, for example, a husband and wife use single-seater taxicab vehicles to go to the same destination, the husband and wife respectively and independently set the destination and pay the fare for taxicab vehicles they are traveling in. That is, they have to perform the same process twice, which may be slightly troublesome. In addition, if either of them sets a wrong destination, the husband and wife may be transported to different places, and it may take time for them to get together.

Moreover, some customers experience difficulty in setting destinations and paying fares by themselves. Assuming that, for example, a mother and a child use single-seater taxicab vehicles to go to the same destination, it may be difficult for the child to set the destination and make a payment. The mother may have to set the destination and pay the fare separately for each of the two taxicab vehicles in which she and her child respectively ride, which may be quite troublesome.

Therefore, the present specification discloses a taxicab system that can further improve the convenience of customers when using a plurality of taxicab vehicles.

A taxicab system according to an aspect of the present specification includes a plurality of taxicab vehicles, each of which transports a customer to a destination by automatic driving without a driver on board, and a management device that manages the plurality of taxicab vehicles. Each taxicab vehicle is configured to form a vehicle group with at least one other taxicab vehicle according to an instruction from the customer or the management device. At least two taxicab vehicles forming the vehicle group are divided into one representative vehicle and at least one subordinate vehicle. The representative vehicle and the subordinate vehicle are respectively configured to execute at least one of a collective billing process to charge a representative customer, who is using the representative vehicle, a fare for each of the plurality of vehicles including the representative vehicle and the subordinate vehicle, and a collective setting process to set a place designated by the representative customer as a destination of all vehicles including the representative vehicle and the subordinate vehicle.

With such a configuration, the representative customer can pay the fare and/or set the destination for the representative vehicle in which they are traveling and the subordinate vehicle in which their companion is traveling. Accordingly, time and effort required to use a plurality of taxicab vehicles can be reduced, and the convenience of customers can be further improved.

In the aspect, the representative vehicle may accept the destination set by the representative customer and transmit such a destination to the subordinate vehicle, while the subordinate vehicle may set the destination of the subordinate vehicle based on the destination received from the representative vehicle.

With such a configuration, the representative customer can automatically set the destination for the subordinate vehicle just by setting the destination for the representative vehicle.

In the aspect, the subordinate vehicle may transmit a fare of the subordinate vehicle to the representative vehicle without charging the customer of the subordinate vehicle the fare. The representative vehicle may charge the representative customer the sum of the fare transmitted from the subordinate vehicle and a fare of the representative vehicle.

With such a configuration, the representative customer can collectively pay the fares of the representative vehicle and the subordinate vehicle.

In the aspect, the taxicab vehicle may instruct, in a case where the customer inputs a value N as the required number of taxicab vehicles, (N−1) other taxicab vehicles located around the taxicab vehicle to form the vehicle group having the taxicab vehicle as the representative vehicle.

In this case, the vehicle group is automatically formed only when the customer specifies the number of taxicab vehicles they need. Accordingly, the time and effort spent by the customer can be reduced.

In the aspect, the taxicab system may further include a plurality of user terminals owned by a plurality of customers. The user terminal may form a terminal group with at least one other user terminal according to an instruction from the customer. The user terminal may transmit an instruction to form the vehicle group reflecting the terminal group to the taxicab vehicle in a case where the customer starts traveling in the taxicab vehicle. The taxicab vehicle may form the vehicle group with the other taxicab vehicles based on the instruction from the user terminal.

With such a configuration, the plurality of customers can form the terminal group upon mutual agreement via a video conference before boarding the taxicab vehicle. By forming the vehicle group reflecting this terminal group, it is possible to effectively prevent a taxicab vehicle from being unintentionally registered in the vehicle group.

In the aspect, the taxicab vehicle may present, upon receiving a request from the customer to form the vehicle group, a list of the other taxicab vehicles which are available for forming the vehicle group with the taxicab vehicle, and form the vehicle group with other taxicab vehicles selected by the customer from the list.

With such a configuration, the customer can incorporate the desired taxicab vehicles into the vehicle group.

In the aspect, the taxicab vehicle may check, after forming the vehicle group, suitability of the vehicle group with the customer who is traveling in the taxicab vehicle, and leave the vehicle group when the customer determines that the vehicle group is unsuitable.

With such a configuration, it is possible to prevent the customer from being charged with the fare of a different taxicab vehicle, and prevent an unrelated taxicab vehicle from moving to the same destination, contrary to the intentions of the customer.

In the aspect, when checking the suitability of the vehicle group, the taxicab vehicle may present, to the customer, in-vehicle images obtained by respectively capturing images of insides of other taxicab vehicles belonging to the vehicle group.

By presenting the image showing the inside of the vehicle and even a customer's face, the customer can accurately identify occupants of the representative vehicle and the subordinate vehicle, such that it is possible to accurately determine whether the formed vehicle group is suitable.

In the aspect, when checking the suitability of the vehicle group, the taxicab vehicle may present, to the customer, an image showing a relative locational relationship between the taxicab vehicle and other taxicab vehicles belonging to the vehicle group.

With such a configuration, the customer can accurately identify the representative vehicle and the subordinate vehicle, such that it is possible to accurately determine whether the formed vehicle group is suitable.

In the aspect, the taxicab vehicle may send, after forming the vehicle group with the other taxicab vehicles, a notification to outside of the taxicab vehicle regarding information indicating cooperation with the other taxicab vehicles.

With such a configuration, the customer who uses the vehicle group can easily identify which taxicab vehicle they should board.

In the aspect, upon executing the collective setting process, the representative vehicle and at least one subordinate vehicle may travel in a convoy while maintaining a formation according to a specified standard.

With such a configuration, the plurality of customers who use the vehicle group are less likely to feel anxious about being separated from each other.

In the aspect, in a case where a management distance that is a distance from a following vehicle belonging to the vehicle group exceeds a specified reference distance while traveling in a convoy, the representative vehicle and at least one subordinate vehicle may decelerate or stop until the management distance becomes equal to or less than the reference distance.

With such a configuration, the plurality of customers who use the vehicle group are even less likely to feel anxious about being separated from each other.

With the aspect disclosed in the present specification, it is possible to reduce the time and effort required and to further improve the convenience of the customers when using the plurality of taxicab vehicles.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
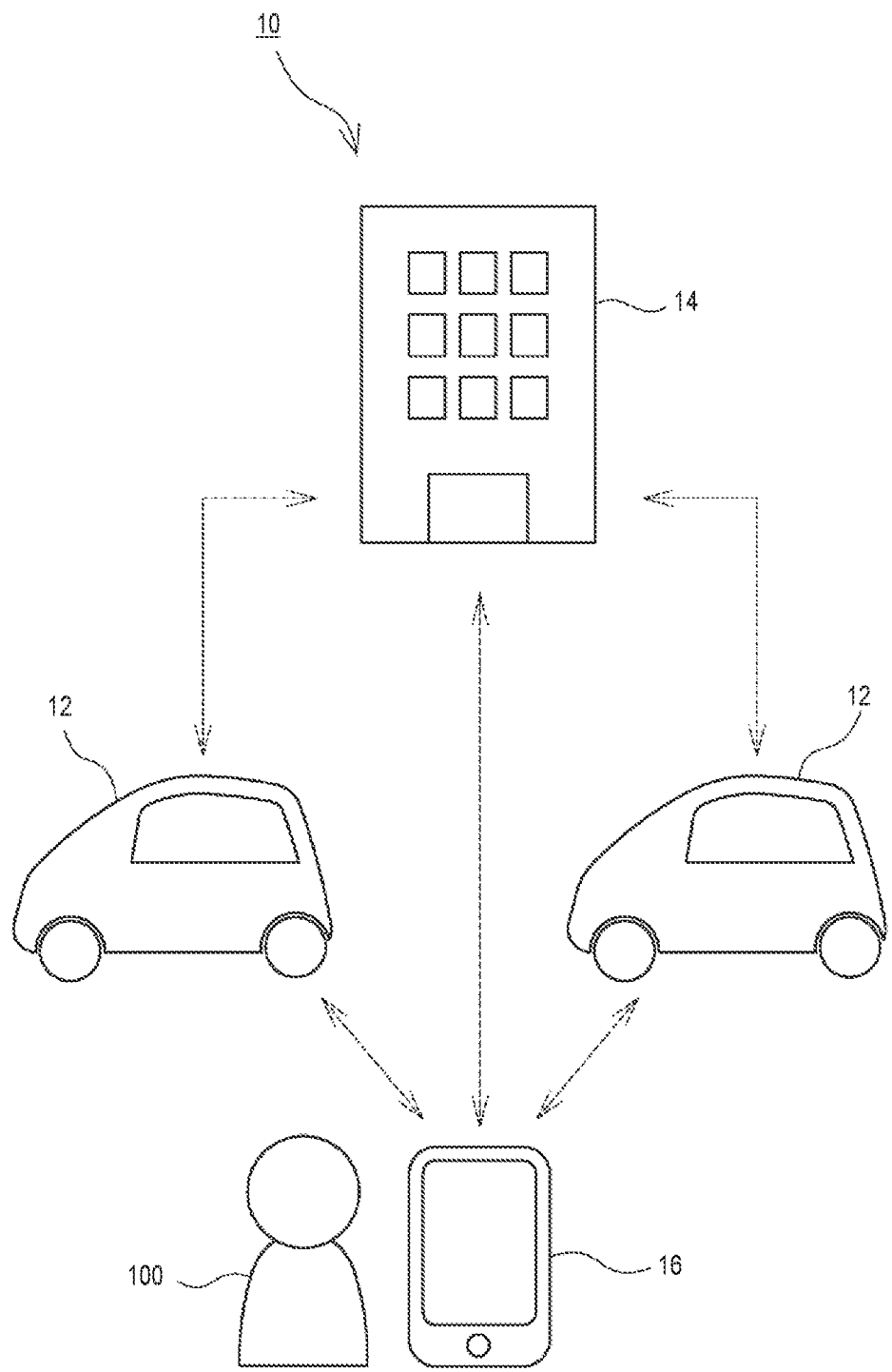
FIG. 1 is an image diagram illustrating a configuration of a taxicab system.

Hereinafter, a configuration of a taxicab system 10 will be described with reference to the drawings. FIG. 1 is an image diagram illustrating a configuration of the taxicab system 10. The taxicab system 10 includes a plurality of taxicab vehicles 12, a management device 14, and a plurality of user terminals 16.

The taxicab vehicle 12 is a vehicle that receives a request from a customer 100 and transports the customer to a destination under an individual contract. The taxicab vehicle 12 of this example is a single-seater vehicle that only one passenger can board. Of course, an infant or toddler is not counted as an occupant and can be accompanied by an adult. Further, the taxicab vehicle 12 is an autonomous vehicle in which all dynamic driving tasks are automatically performed by the vehicle. Therefore, a driver does not board the taxicab vehicle 12.

The "autonomous driving" herein refers to a vehicle performing almost all of the dynamic driving tasks, for example SAE Level 3 to Level 5 as defined by the Society of Automotive Engineers in the United States. Level 3 is a driving mode under specific circumstances in which all dynamic driving tasks are automatically performed, such as on the expressway, but human override is still an option in an emergency. Level 4 is a driving mode under specific circumstances in which all dynamic driving tasks are automatically performed and emergency response is also automatically processed. Level 5 is a driving mode in which all driving tasks are automatically performed under almost all conditions, which means so-called "full automation".

The management device 14 is a device that manages vehicle dispatch of the taxicab vehicle 12. The management device 14 collects and manages locations and service states of the taxicab vehicles 12. The possible service states of the taxicab vehicle 12 include, for example, "empty", "in service", "not in service" and "called". The management device 14 further calculates a desirable manner of dispatch of the taxicab vehicle 12 in consideration of a request from the customer, and locations of the taxicab vehicles 12 and passengers within a city, and outputs a dispatch instruction to the taxicab vehicle 12. The taxicab vehicle 12 appropriately travels according to this dispatch instruction.

The user terminal 16 is an information terminal owned by the customer 100, for example, a mobile information terminal such as a smartphone. A dedicated application is installed in the user terminal 16 in advance for using the taxicab system 10.

The customer has two options when they use the taxicab vehicle 12, the customer 100 moves to within the vicinity of the taxicab vehicle 12 and hails it, or calls the taxicab vehicle 12 to pick them up. Calling the taxicab vehicle includes a reservation for designating a future date and time when the customer wants to use the taxicab vehicle 12. These options will be described hereinbelow with reference to FIGS. 2 and 3.

Figure 2:
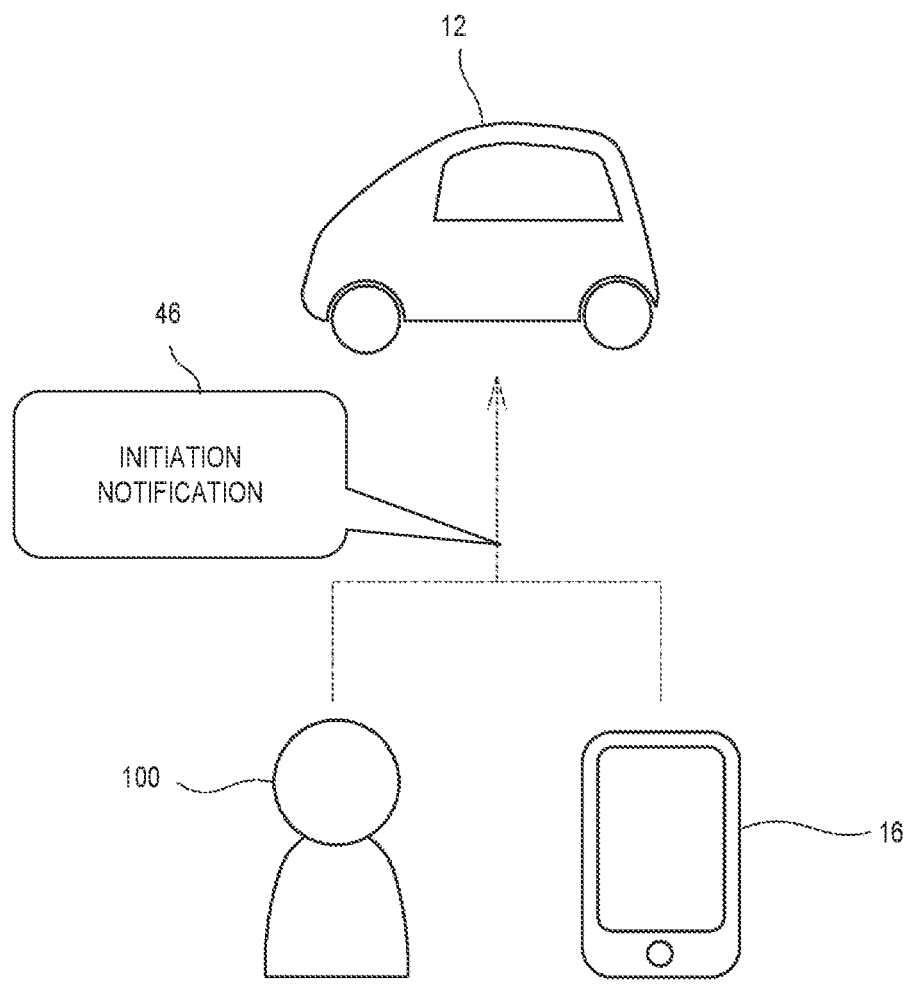
FIG. 2 is an image diagram illustrating a situation where a customer hails a taxicab.

FIG. 2 is an image diagram illustrating a situation where the customer hails the taxicab. In such a case, the customer 100 moves to the vicinity of the empty taxicab vehicle 12, and transmits an initiation notification 46 to the taxicab vehicle 12. The initiation notification 46 may be transmitted by operating the user terminal 16 or by operating a user interface device (hereinafter abbreviated as "user I/F") mounted on the taxicab vehicle 12. When receiving the initiation notification 46, the taxicab vehicle 12 notifies the management device 14 that it will start to transport the customer 100, i.e., that it is in an "in service" state.

Figure 3:
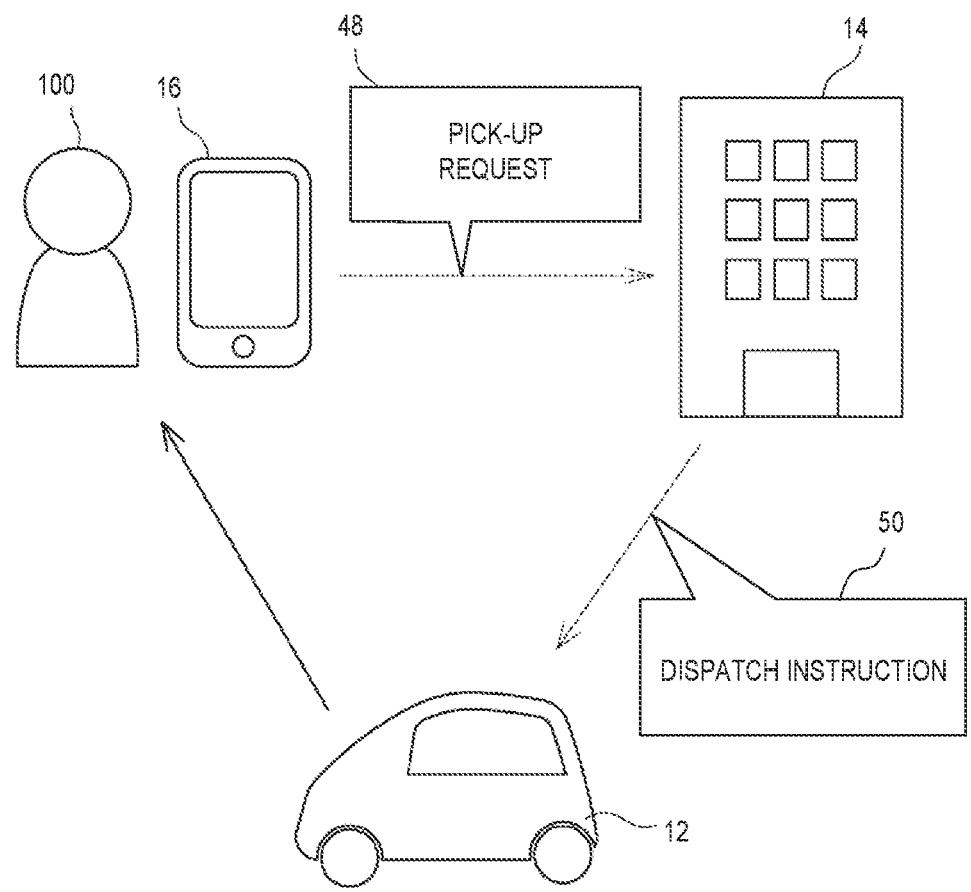
FIG. 3 is an image diagram illustrating a situation where a customer calls a taxicab.

A situation where the customer calls the taxicab will be described hereinbelow. FIG. 3 is an image diagram illustrating the situation where the customer calls the taxicab. In this case, the customer 100 operates the user terminal 16 to send a pick-up request 48 to the management device 14 when they call the taxicab. The pick-up request 48 includes at least a boarding location of the customer 100 and desired date/time when they board the taxicab. The desired date/time may be set as a specific date/time or as "immediately". Further, the pick-up request 48 may further include at least one of a destination, a payment method, and the number of taxicab vehicles 12 required.

The management device 14 dispatches the taxicab vehicle 12 in response to the received pick-up request 48. In particular, the management device 14 transmits a dispatch instruction 50 to the taxicab vehicle 12 such that the taxicab vehicle 12 can arrive at the boarding location at the desired date/time as designated in the pick-up request 48. The taxicab vehicle 12 receives the dispatch instruction 50 and automatically moves to the boarding location to arrive at the desired date/time. The customer 100 boards the taxicab vehicle 12 dispatched to the boarding location.

In FIGS. 2 and 3, a case where one customer 100 uses one taxicab vehicle 12 has been described as one example. However, a plurality of customers 100 who travel together may use a plurality of taxicab vehicles 12. In such a case, it is troublesome and undesirable for each customer 100 to separately pay a fare or set a destination. In the taxicab system 10 disclosed in the present specification, upon a request from the customer 100, a vehicle group can be formed by the plurality of taxicab vehicles 12. In a case where the vehicle group is formed, one customer can collectively pay the fares and set the destination for the plurality of taxicab vehicles 12. This vehicle group will be described in detail later.

Figure 4:
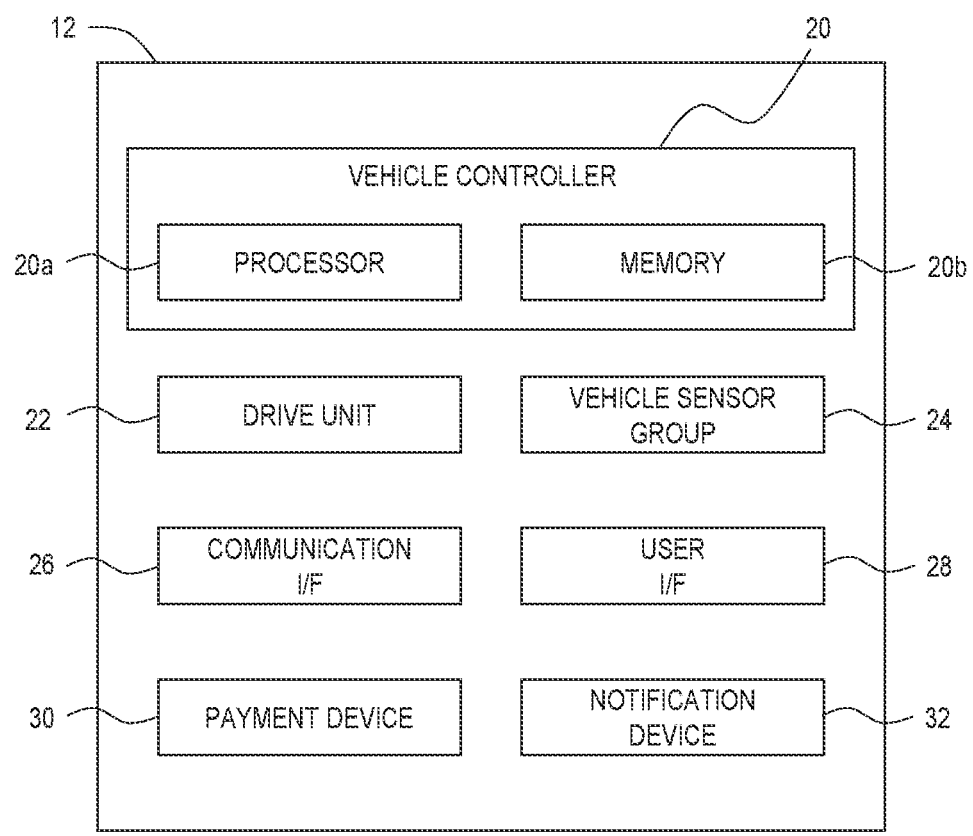
FIG. 4 is a block diagram illustrating a schematic configuration of a taxicab vehicle.

Configurations of the taxicab vehicle 12 and the management device 14 will be described respectively. FIG. 4 is a block diagram illustrating a schematic configuration of the taxicab vehicle 12. A drive unit 22 is a device that generates a mechanical driving force for driving the taxicab vehicle 12, and includes, for example, a prime mover, a power transmission device, a brake device, a suspension device, and a steering device. A vehicle sensor group 24 includes a plurality of sensors for detecting various pieces of information necessary for the taxicab vehicle 12 to travel. The vehicle sensor group 24 includes, for example, a sensor for detecting a surrounding environment of the taxicab vehicle 12 (for example, camera, LiDAR, millimeter wave radar, and ultrasonic sensor), a sensor for detecting a current location of the taxicab vehicle 12 (for example, GPS), and a sensor for detecting a traveling state of the taxicab vehicle 12 (for example, acceleration sensor and gyro sensor). The information detected by the vehicle sensor group 24 is transmitted to a vehicle controller 20. The vehicle controller 20 calculates an amount of acceleration/deceleration and steering required for the taxicab vehicle 12 based on the information detected by the vehicle sensor group 24, and drives the drive unit 22.

A communication I/F 26 uses a communication protocol to establish communication with an information device outside the vehicle. In this case, such an information device includes, for example, a management device 14, a user terminal 16, and another taxicab vehicle 12. The communication may be performed as mobile data communication provided by a wireless provider, short-range wireless communication such as Bluetooth (registered trademark), or via a dedicated communication line.

A user I/F 28 is a device that presents information to the customer 100 and accepts the operation from the customer 100. The user I/F 28 has, for example, an output device that outputs information to the customer 100 and an input device that accepts the operation of the customer 100. The output device may include, for example, at least one of a display, a speaker, and a lamp. Further, the input device may include, for example, at least one of a touchscreen, a keyboard, a switch, a lever, a pedal, and a microphone.

A payment device 30 is a device that collects the fare of the taxicab vehicle 12 alone or in cooperation with the management device 14. Therefore, the payment device 30 is a device for collecting the fare, for example, a money device that counts the amount of cash paid and gives change if necessary, or a card reader that processes payment by a credit card, an RFID reader/writer that establishes communication with an IC chip built in a prepaid card, or a barcode reader for barcode payment. Further, the payment device 30 may be a device that acquires access information (for example, identification information and a PIN code of the customer 100) to access an e-wallet registered in advance by the customer 100, and transmits the access information to the management device 14. In this case, based on the received access information, the management device 14 accesses the e-wallet of the customer 100 and collects the fare.

A notification device 32 is a device that sends a notification to the outside of the vehicle regarding a forming status of the vehicle group. The vehicle group is a group of at least two taxicab vehicles 12 as described above. At least two taxicab vehicles 12 forming the vehicle group collectively process at least one of payment of the fares and setting of the destination, which will be described later. The notification device 32 sends a notification to the outside of the taxicab vehicle 12, in a case where the vehicle group is formed by the taxicab vehicle 12 with the other taxicab vehicles 12, regarding information indicating cooperation between them. The notification device 32 includes, for example, at least one of a lamp that emits light at a position visible from the outside of the vehicle, a display that displays information in a display area provided at a position that can be seen from the outside of the vehicle, and a speaker that outputs voice to the outside of the vehicle.

The vehicle controller 20 controls driving of the taxicab vehicle 12. For example, the vehicle controller 20 identifies the surrounding environment of the taxicab vehicle 12 from the detection results of the vehicle sensor group 24, and controls the driving of the drive unit 22 so as to ensure safe traveling of the taxicab vehicle 12. Further, the vehicle controller 20 manages the forming status of the vehicle group as necessary, and manages the setting of the destination and the charging of fares according to the forming status.

Such a vehicle controller 20 is a computer having a processor 20a and a memory 20b. The "computer" herein also includes a microcontroller that incorporates a computer system into an integrated circuit. Further, the processor 20a refers to a processor in a broad sense, which includes a general-purpose processor (for example, a central processing unit (CPU)) and a dedicated processor (for example, a graphics processing unit (GPU), application specific integrated circuit (ASIC), field processor gate array (FPGA), or programmable logic device). The processor 20a does not have to be a single physical element, and may include a plurality of processors that are physically separated from each other. Similarly, the memory 20b does not have to be a single physical element, and may be configured by a plurality of memories that are physically separated from each other. The memory 20b may include at least one of a semiconductor memory (for example, a RAM, ROM, and solid state drive) and a magnetic disk (for example, a hard disk drive).

Figure 5:
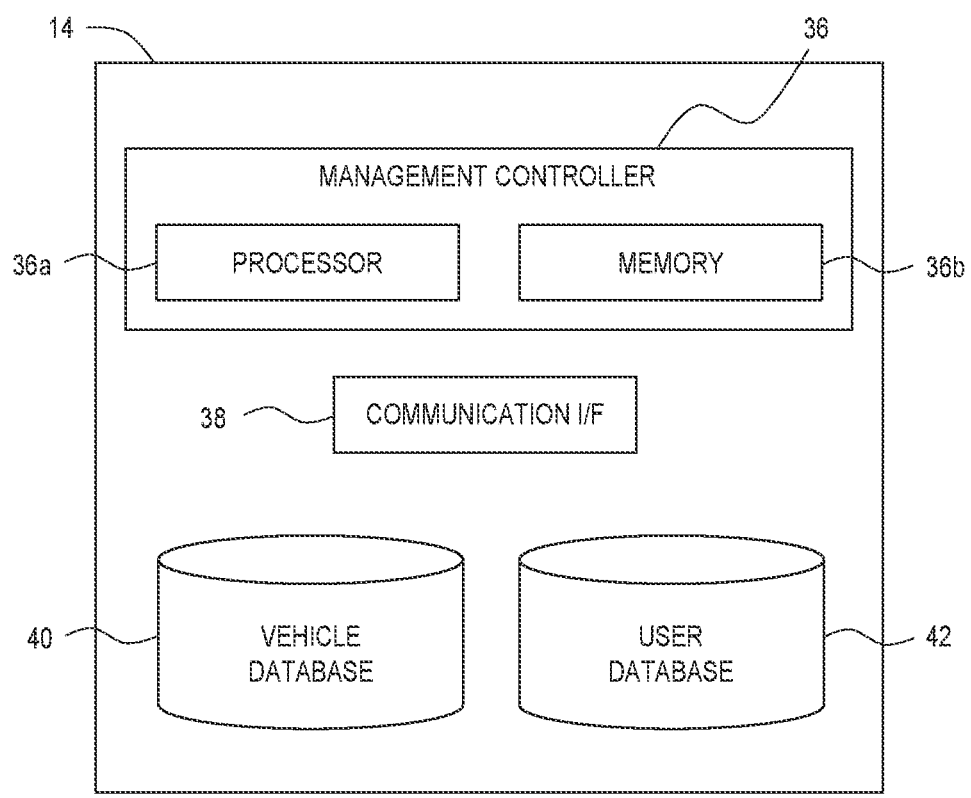
FIG. 5 is a block diagram illustrating a schematic configuration of a management device.

A configuration of the management device 14 will be described. FIG. 5 is a block diagram illustrating a schematic configuration of the management device 14. The management device 14 has a management controller 36, a communication I/F 38, a vehicle database 40, and a user database 42. The communication I/F 38 establishes communication with the user terminal 16 via a general-purpose communication network such as a mobile data network. The communication I/F 38 establishes communication with the taxicab vehicles 12 via a general-purpose communication network or a dedicated communication network.

The vehicle database 40 is a database that stores information on the taxicab vehicles 12 constituting the taxicab system 10. The vehicle database 40 stores, for example, identification information, locations, service states, and forming status of the vehicle group for each taxicab vehicle 12.

The user database 42 stores information on the customer 100. The information on the customer 100 stored in the user database 42 includes, for example, identification information, name, and contact information of the customer 100. Other information, such as a place often set as the destination by the customer 100 (for example, a home address or an address of a company where the customer works) may be stored in association with the identification information of the customer 100. The user database 42 may further store information on the e-wallet used by the customer 100, for example, an account number for direct payment or a credit card number The management controller 36 controls the vehicle dispatch of the taxicab vehicle 12 in response to the request from the customer 100 transmitted via the user terminal 16. The management controller 36 updates the vehicle database 40 based on the information transmitted from the taxicab vehicle 12. The management controller 36 also updates the user database 42 based on the registered information of the customer 100 transmitted via the user terminal 16. Such a management controller 36 is configured by a computer having a processor 36a and a memory 36b.

The vehicle group formed in such a taxicab system 10 will be described. As described above, the taxicab vehicle 12 of this example is a single-seater autonomous vehicle. Therefore, when a plurality of passengers want to board taxicabs, it is necessary to find a plurality of taxicab vehicles 12 at the same time. In this situation, it is quite inconvenient for the customer 100 of each taxicab vehicle 12 to separately set the destination and pay the fare.

Assuming that, for example, a husband and a wife use two taxicab vehicles 12 to move to the same destination, it is unnecessary for them to set the destination separately since they want to go to the same destination. If the wife or the husband sets the wrong destination, they will be transported to different places, and it will take time for them to meet again.

Moreover, some customers 100 experience difficulty in setting destinations and paying fares by themselves. Assuming that, for example, a mother and a child use two taxicab vehicles 12 to move to the same destination, it is difficult for the child to set the destination and make a payment. Therefore, it is necessary for the mother to set the destination and pay the fares for both taxicab vehicles 12 used by herself and her child. It is quite troublesome to set the destination and pay the fare separately when both taxicab vehicles 12 will travel to the same destination.

In order to reduce the time and effort required when the plurality of people use the taxicab system 10 and in order to improve the convenience of the customer 100, the vehicle group can be formed. The vehicle group is a group formed by at least two taxicab vehicles 12 designated from the customer 100 or the management device 14. At least two taxicab vehicles 12 forming the vehicle group are divided into one representative vehicle and at least one subordinate vehicle.

Figure 6:
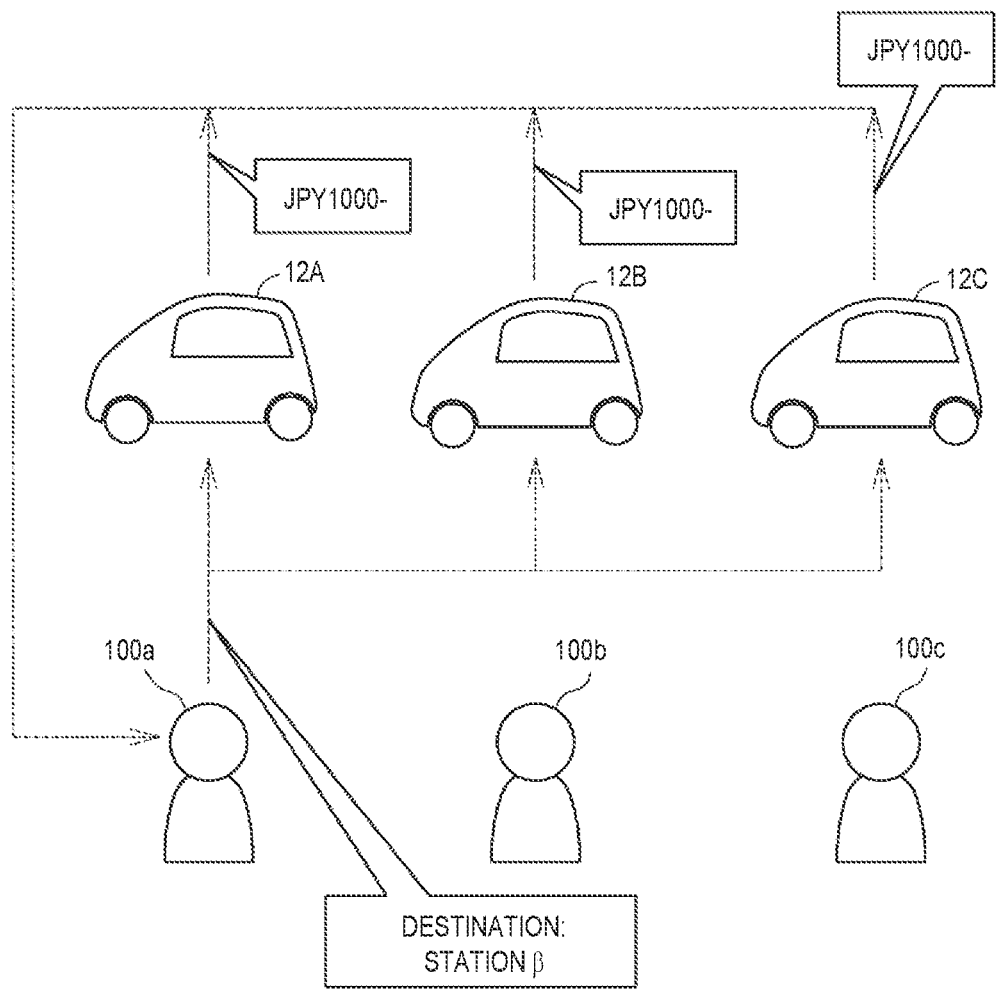
FIG. 6 is an image diagram of a vehicle group.

FIG. 6 is an image diagram of the vehicle group. In the drawings and description below, subscripts A, B, and C are added to reference numerals of the taxicab vehicle 12 and related elements as necessary, and subscripts a, b, and c are added to reference numerals of the customer 100 and related elements.

In FIG. 6, the vehicle group is formed by three taxicab vehicles 12A, 12B, and 12C. The taxicab vehicle 12A is the representative vehicle, and the taxicab vehicles 12B and 12C are the subordinate vehicles. A customer 100a who boards the representative vehicle 12A is a representative customer, and customers 100b and 100c, who respectively board the subordinate vehicles 12B and 12C, are subordinate customers.

In a case where the vehicle group is formed, the representative vehicle 12A and the subordinate vehicles 12B and 12C execute at least one of a collective billing process and a collective setting process. The collective billing process is a process of charging the representative customer 100a for the total fares of the representative vehicle 12A and the subordinate vehicles 12B and 12C. With the collective billing process, the subordinate customers 100b and 100c do not have to pay the fares, and the representative customer 100a can make a collective payment. Consequently, even when an adult gets together with a companion who cannot make a payment, e.g., a child, they can conveniently use several taxicab vehicles. When going out with people who share a household budget, for example a family, or when employees travel together for work, it is not necessary to make separate payments when using this system, thus making the billing process more convenient.

Further, the collective setting process is a process of setting one location designated by the representative customer 100a as the destination of each of the representative vehicle 12A and the subordinate vehicles 12B and 12C. With this collective setting process, it is not necessary for the subordinate customers 100b and 100c to set the destination separately from the representative customer 100a. Consequently, even when an adult travels to the same destination with a companion who cannot set a destination by themselves, e.g., a child, they can conveniently use several taxicab vehicles. With the collective setting process, the representative vehicle 12A and the subordinate vehicles 12B and 12C can move to the same destination. Therefore, it is possible to prevent the customers 100a, 100b, and 100c, who travel to the same destination together, from being unintentionally separated.

In FIG. 6, both the collective billing process and the collective setting process are executed, but only one of them may be executed. For example, the representative vehicle 12A and the subordinate vehicles 12B and 12C travel to the same destination set by the representative customer 100a, while the fare is individually paid by each of the customers 100a, 100b, and 100c. Further, the total fares of the representative vehicle 12A and the subordinate vehicles 12B and 12C are paid by the representative customer 100a, while the destination may be set independently for each taxicab vehicle 12.

Figure 7:
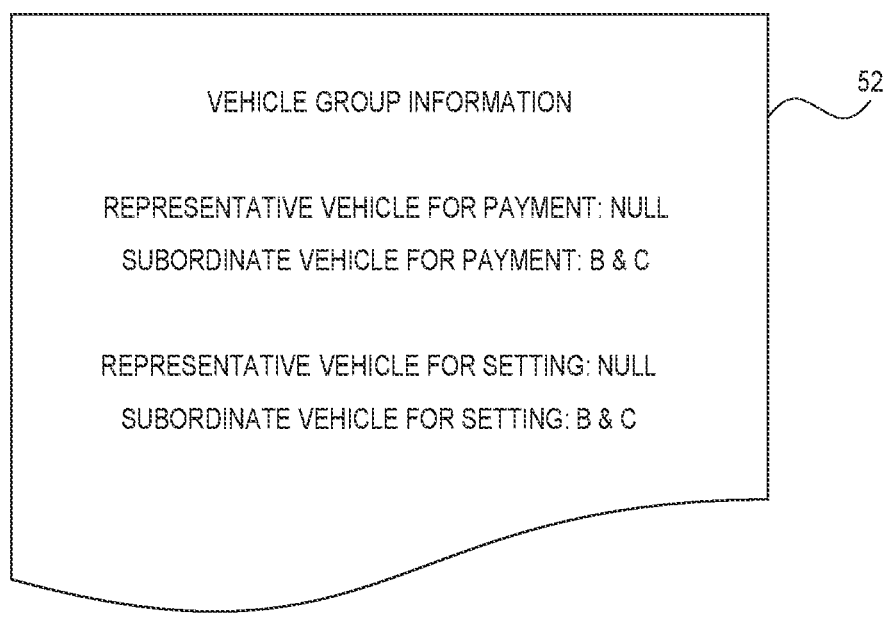
FIG. 7 is a diagram illustrating one example of vehicle group information stored in a representative vehicle.

The taxicab vehicle 12 that forms the vehicle group stores vehicle group information 52 in the memory 20b. FIG. 7 is a diagram illustrating one example of the vehicle group information 52 stored in the representative vehicle 12A. In the example shown in FIG. 7, the vehicle group information 52 includes identification information of each of a representative vehicle for payment, a subordinate vehicle for payment, a representative vehicle for setting, and a subordinate vehicle for setting. The representative vehicle for payment and the subordinate vehicle for payment are the representative vehicle and the subordinate vehicle in the collective billing process. In a case where the representative vehicle for payment is set, the taxicab vehicles 12 charge the fares of the taxicab vehicles 12 to the customer using the representative vehicle for payment, that is, the representative customer.

The representative vehicle for setting and the subordinate vehicle for setting are the representative vehicle and the subordinate vehicle in the collective setting process. In a case where the representative vehicle for setting is set, the taxicab vehicles 12 set the destination based on the instruction from the customer using the representative vehicle for payment, that is, the representative customer.

Columns of the representative vehicle for payment, the subordinate vehicle for payment, the representative vehicle for setting, and the subordinate vehicle for setting will be marked with "NULL" in a case where no vehicle is set. Since the representative vehicle 12A is the representative vehicle, its columns of the representative vehicle for payment and the representative vehicle for setting are marked with "NULL". Since the subordinate vehicles 12B and 12C are the subordinate vehicles, their columns of the subordinate vehicle for payment and the subordinate vehicle for setting are marked with "NULL". In a case where the vehicle group is not formed, the columns of the representative vehicle for payment, the subordinate vehicle for payment, the representative vehicle for setting, and the subordinate vehicle for setting are all marked with "NULL".

Figure 8:
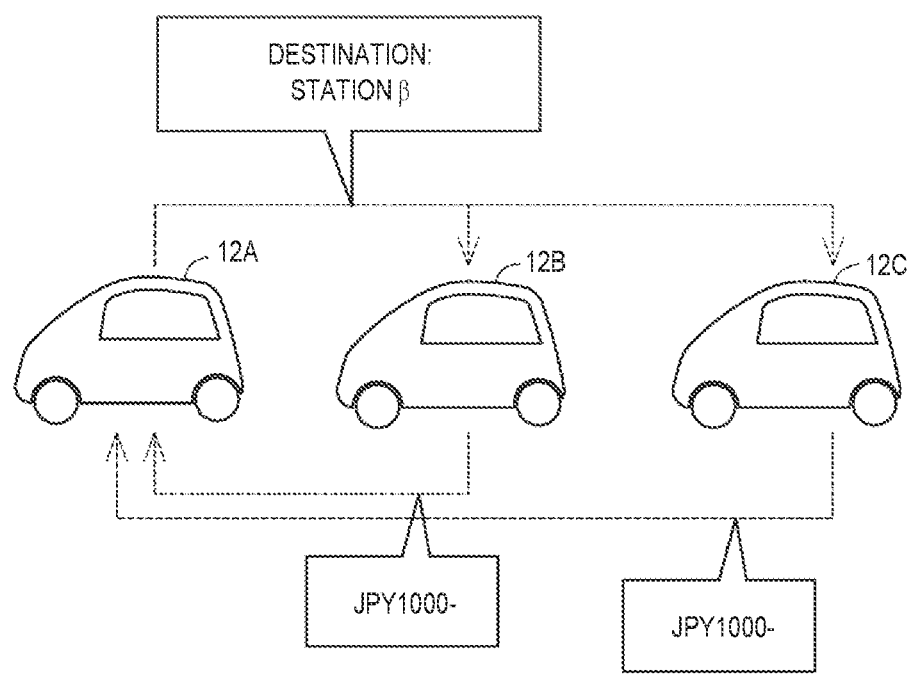
FIG. 8 is an image diagram illustrating a collective billing process and a collective setting process.

Specific examples of the collective billing process and the collective setting process will be described. FIG. 8 is an image diagram illustrating the collective billing process and the collective setting process. When executing the collective billing process, the subordinate vehicles 12B and 12C transmit the fares of the subordinate vehicles 12B and 12C to the representative vehicle 12A using vehicle-to-vehicle (V2V) communication, or the like. The representative vehicle 12A charges the representative customer 100a the total fares of the representative vehicle 12A and the subordinate vehicles 12B and 12C such that the representative customer makes a payment.

In a case where the collective setting process is executed, the representative vehicle 12A transmits, when the customer 100a who is traveling in the representative vehicle 12A sets the destination of the representative vehicle 12A ("station β" in the example of FIG. 8), the destination set by the customer 100a to the subordinate vehicles 12B and 12C using the V2V communication. The subordinate vehicles 12B and 12C set the destination transmitted from the representative vehicle 12A as their own destinations.

A processing procedure described with reference to FIG. 8 is merely one example, and other embodiments may be adopted as long as the representative customer 100a using the representative vehicle 12A can collectively pay the fares and set the destination. For example, a part of the collective billing process and the collective setting process may be executed by the management device 14, or a representative user terminal 16a owned by the representative customer 100a. For example, the destination of the representative vehicle 12A may be transmitted from the representative vehicle 12A to the subordinate vehicles 12B and 12C via the management device 14. As another embodiment, the destination may be transmitted from the user terminal 16 owned by the representative customer 100a, that is, the representative user terminal 16a, to the representative vehicle 12A and the subordinate vehicles 12B and 12C.

The fares of the subordinate vehicles 12B and 12C may be collected by each of the subordinate vehicles 12B and 12C via communication with the representative user terminal 16a. As another embodiment, the representative vehicle 12A and the subordinate vehicles 12B and 12C notify the management device 14 of their own fares, and the management device 14 collects the total fares from the representative customer 100a.

Figure 9:
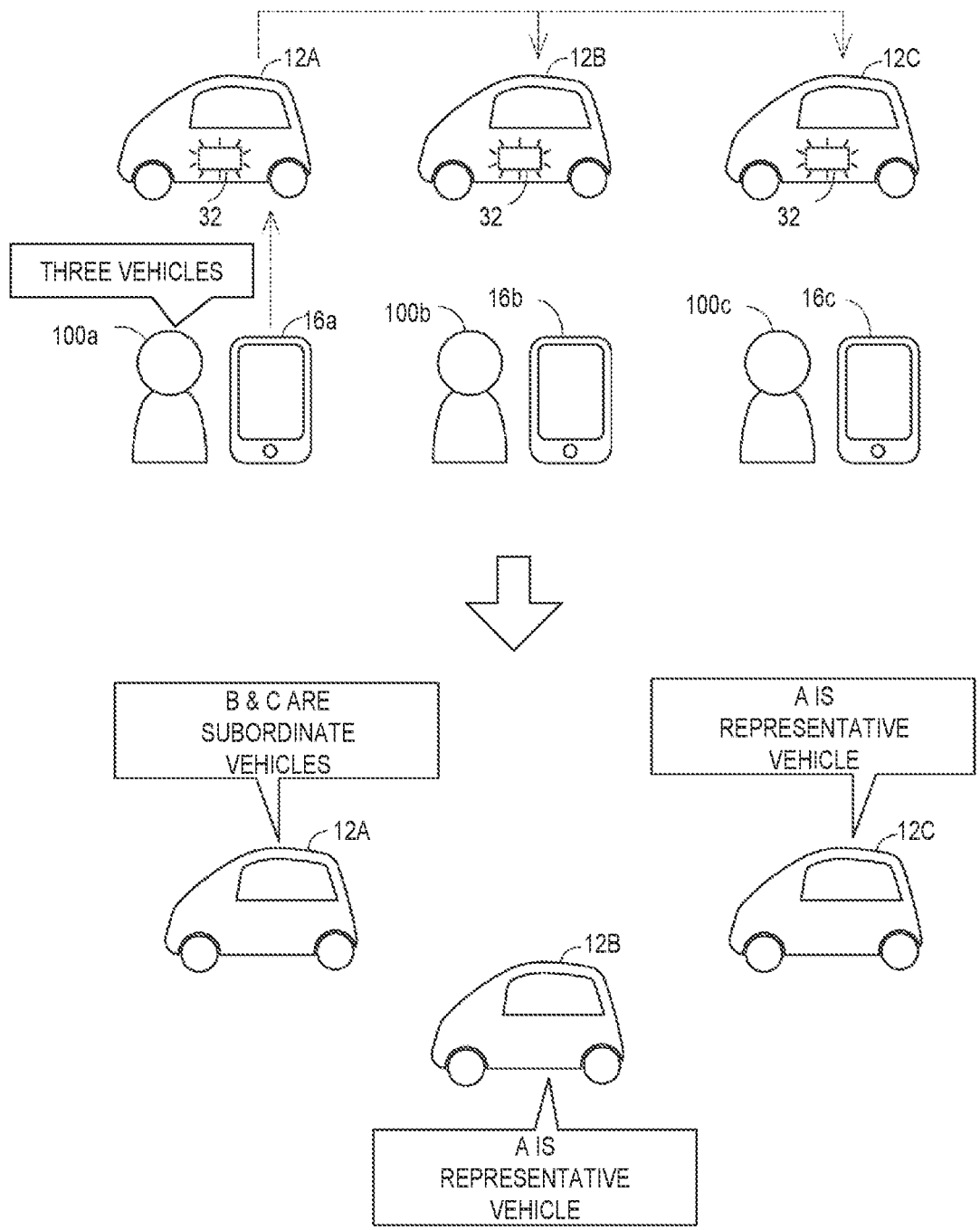
FIG. 9 is an image diagram illustrating a flow of an instruction to form the vehicle group.

The taxicab vehicle 12 described above forms the vehicle group by receiving an instruction from the customer 100 or the management device 14. A flow of the instruction to form the vehicle group will be described. FIG. 9 is an image diagram illustrating the flow of the instruction to form the vehicle group. In the example of FIG. 9, one customer 100a can form the vehicle group by notifying one taxicab vehicle 12A of the required number of taxicab vehicles 12. In particular, the customers 100a, 100b, and 100c hail three taxicab vehicles 12A, 12B, 12C as shown in FIG. 9. In this case, the customer 100a operates the user terminal 16a or the user I/F 28 of the taxicab vehicle 12A to notify the nearby taxicab vehicle 12A of the required number N of taxicab vehicles 12 (N is 3 in the example shown in FIG. 9). Upon receiving this notification, the taxicab vehicle 12A instructs (N−1) taxicab vehicles 12B and 12C located nearby to form the vehicle group. Upon receiving this instruction, the taxicab vehicles 12B and 12C register the taxicab vehicle 12A as the "representative vehicle" in the vehicle group information 52. The taxicab vehicle 12A registers the taxicab vehicles 12B and 12C as the "subordinate vehicles" in the vehicle group information 52.

When the vehicle group can be formed, the representative vehicle 12A and the subordinate vehicles 12B and 12C respectively use the notification device 32 to send a notification to the outside of the vehicle regarding the information indicating their cooperation. For example, the representative vehicle 12A and the subordinate vehicles 12B and 12C respectively have a lamp attached to an outer peripheral surface of the vehicle as a part of the notification device 32, and notify people outside the vehicle that they are forming the vehicle group by lighting their lamps with the same color. As another embodiment, the representative vehicle 12A and the subordinate vehicles 12B and 12C respectively may have a display attached to the outer peripheral surface of the vehicle as a part of the notification device 32, and notify people outside the vehicle that they are forming the vehicle group by displaying the same image on their displays. When the vehicle group is formed, the taxicab vehicles 12A, 12B, and 12C belonging to the vehicle group send a notification to the outside of the vehicle regarding the information indicating their cooperation, such that the customers 100a, 100b, and 100c can easily identify the taxicab vehicles 12 that they should board.

When the vehicle group can be formed, the customers 100a, 100b, and 100c respectively board the taxicab vehicles 12A, 12B, and 12C which form the vehicle group. The taxicab vehicles 12A, 12B, and 12C respectively check with the customers 100a, 100b, and 100c whether the vehicle group is suitable or not. In particular, the representative vehicle 12A and the subordinate vehicles 12B and 12C respectively ask the customers 100a, 100b, and 100c whether it is correct that the customer 100a has a responsibility to pay the fares and set the destination of the subordinate vehicles 12B and 12C. When the customers 100a, 100b, and 100c determine that the currently formed vehicle group is unsuitable, the vehicles determined as unsuitable leave the vehicle group. If either the representative vehicle does not remain or none of the subordinate vehicles remain after the vehicles leave the group, the vehicle group itself is eliminated. For example, in a case where the subordinate customer 100b determines that the taxicab vehicle 12B is unsuitable, the taxicab vehicle 12B leaves the vehicle group, and the remaining taxicab vehicles 12A and 12C form the vehicle group. On the other hand, in a case where the representative customer 100a determines that the vehicle group is unsuitable, or all the subordinate customers 100b and 100c determine that the vehicle group is unsuitable, the vehicle group itself is eliminated. When the vehicle group is formed, it is possible to prevent the customers 100 from unintentionally being charged fares or unrelated vehicles from tracking the customers 100 by checking the suitability of the vehicle group with the customers. Consequently, the customers 100 can comfortably use the taxicab system 10.

An embodiment of checking whether the formed vehicle group is suitable is not particularly limited. For example, the representative vehicle 12A may present the identification information of the subordinate vehicles 12B and 12C to the customer 100a to check whether it is correct that the customer 100a has a responsibility to pay the fares and set the destination of the subordinate vehicles 12B and 12C. Similarly, the subordinate vehicles 12B and 12C may present the identification information of the representative vehicle 12A to the customers 100a and 100b to check whether it is suitable that the representative vehicle 12A is entitled to pay the fares and set the destination.

Figure 10:
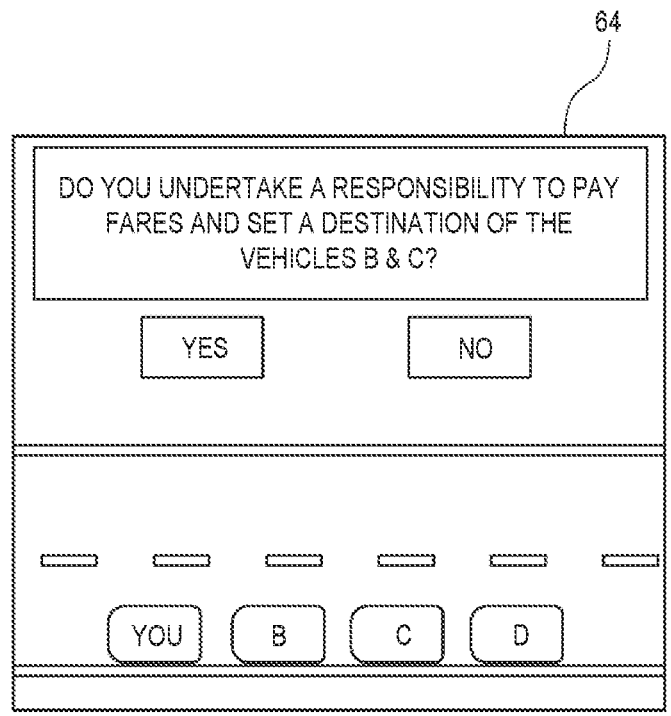
FIG. 10 is a diagram illustrating one example of a confirmation screen for checking suitability regarding the formed vehicle group.

Instead of the vehicle identification information, an image showing a relative locational relationship of the vehicles may be displayed, and then the suitability of the formed vehicle group may be checked. FIG. 10 is a diagram illustrating one example of a confirmation screen 64 displayed for the representative vehicle 12A in such a case. In the example of FIG. 10, the confirmation screen 64 includes a message for checking whether the formed vehicle group is suitable and a plan view around the representative vehicle 12A. The customer 100a checks locations of the subordinate vehicles 12B and 12C on the confirmation screen 64, and determines whether they should undertake a responsibility to pay the fares and set the destination of the subordinate vehicles 12B and 12C. Similarly, the subordinate vehicles 12B and 12C respectively present, to the customers 100b and 100c, the confirmation screen 64 including a message checking whether the formed vehicle group is suitable and a plan view around the subordinate vehicle 12B or 12C. The customers 100b and 100c respectively check a location of the representative vehicle 12A on the confirmation screen 64, and determine whether they should give responsibility for paying the fares and setting the destination of the subordinate vehicles 12B and 12C to the occupant of the representative vehicle 12A. By presenting the image showing the relative locational relationship of the vehicles to the customers 100a, 100b, and 100c, the customers 100a, 100b, and 100c can accurately identify the representative vehicle 12A and the subordinate vehicles 12B and 12C, thereby making it possible to more accurately judge whether the formed vehicle group is suitable.

Figure 11:
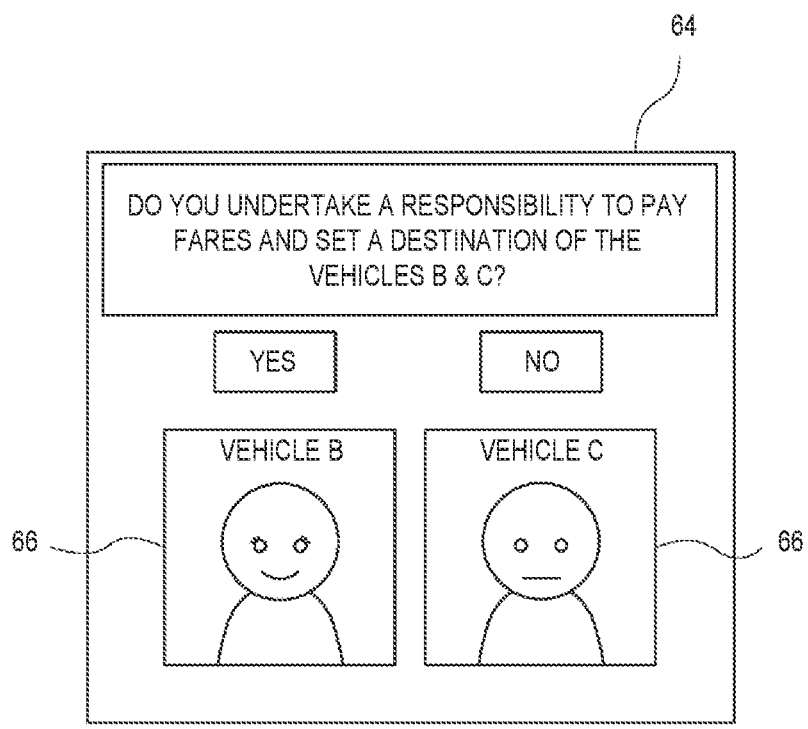
FIG. 11 is a diagram illustrating another example of the confirmation screen for checking suitability regarding the formed vehicle group.

As another embodiment, the taxicab vehicle 12 may present, to the customer, in-vehicle images respectively capturing the inside of the other taxicab vehicles 12 belonging to the vehicle group when checking whether the formed vehicle group is suitable. FIG. 11 is a diagram illustrating one example of the confirmation screen 64 displayed for the representative vehicle 12A in such a case. In the example of FIG. 11, the confirmation screen 64 includes the message for checking whether the formed vehicle group is suitable and in-vehicle images 66 capturing vehicle compartments of the subordinate vehicles 12B and 12C. The customer 100a checks faces of occupants in the subordinate vehicles 12B and 12C on the confirmation screen 64, and determines whether they should undertake a responsibility to pay the fares and set the destination of the subordinate vehicles 12B and 12C. Similarly, the subordinate vehicles 12B and 12C respectively present to the customers 100b and 100c the confirmation screen 64 including the message checking whether the formed vehicle group is suitable and an in-vehicle image 66 capturing a vehicle compartment of the representative vehicle 12A. The customers 100b and 100c respectively check a face of an occupant in the representative vehicle 12A on the confirmation screen 64, and determine whether they should give responsibility for paying the fares and setting the destination of the subordinate vehicles 12B and 12C to the occupant of the representative vehicle 12A. By being presented with the in-vehicle image 66, the customers 100*a*, 100*b*, and 100*c* can accurately identify occupants of the representative vehicle 12A and the subordinate vehicles 12B and 12C, such that it is possible to accurately determine whether the formed vehicle group is suitable.

Figure 12:
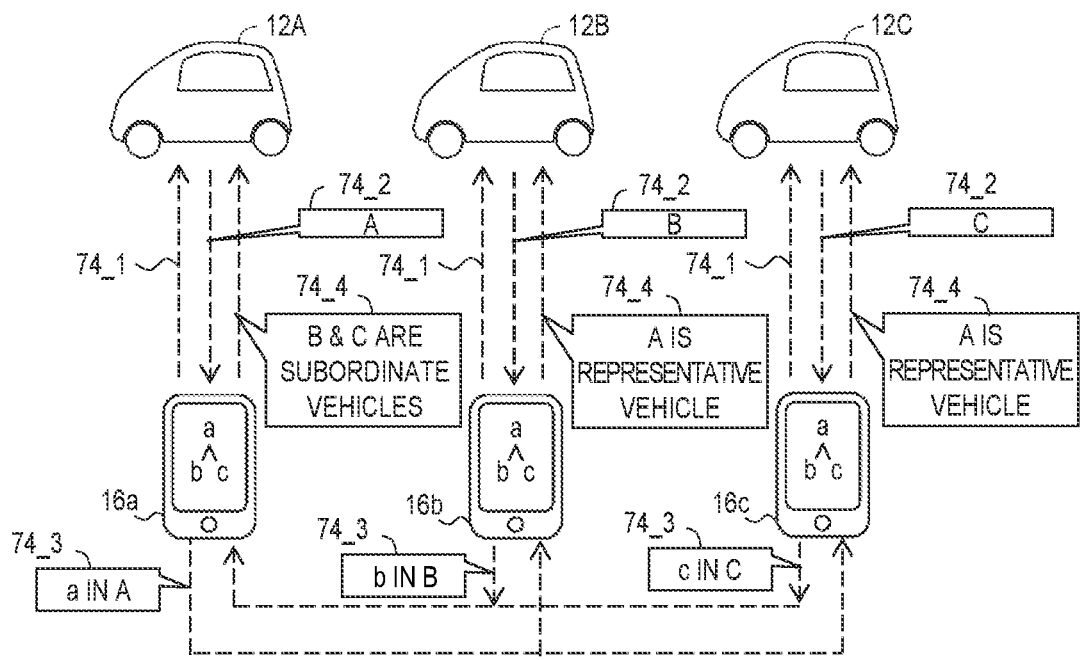
FIG. 12 is an image diagram illustrating another example of the flow of the instruction to form the vehicle group.

Another example of the flow of the instruction to form the vehicle group will be described. FIG. 12 is an image diagram illustrating another example of the flow of the instruction to form the vehicle group. In the example of FIG. 12, the user terminals 16*a*, 16*b*, and 16*c* can form a terminal group with each other according to the instructions from the customers 100*a*, 100*b*, and 100*c*. The terminal group is a group including one representative user terminal 16*a* and subordinate user terminals 16*b* and 16*c*. In a case where the terminal group is formed, terminal group information is registered in the user terminals 16*a*, 16*b*, and 16*c*. The terminal group information is information indicating a configuration of the terminal group, that is, information indicating which of the user terminals 16*a*, 16*b*, and 16*c* is the representative user terminal, and which are the subordinate user terminals.

The taxicab vehicles 12A, 12B, and 12C form the vehicle group reflecting the terminal group information transmitted from the user terminals 16*a*, 16*b*, and 16*c*. For example, when the terminal group can be formed, the customers 100*a*, 100*b*, and 100*c* operate the user terminals 16*a*, 16*b*, and 16*c* and transmit initiation instructions 74_1 to the nearby taxicab vehicles 12A, 12B, and 12C, respectively. The taxicab vehicles 12A, 12B, and 12C respectively transmit their own identification information 74_2 to the user terminals 16*a*, 16*b*, and 16*c*, which are counterparts. Subsequently, the user terminals 16*a*, 16*b*, and 16*c* respectively transmit corresponding information 74_3, in which the identification information of the user terminal 16*a*, 16*b*, or 16*c* is associated with the identification information of each taxicab vehicle they will board, to the other user terminals 16*a*, 16*b*, and 16*c*. Upon receiving the corresponding information 74_3, each of the user terminals 16*a*, 16*b*, and 16*c* compares the corresponding information 74_3 with the terminal group information and identifies the identification information of the representative vehicle and the subordinate vehicles. The user terminals 16*a*, 16*b*, and 16*c* respectively transmit the identification information 74_4 of the representative vehicle and the subordinate vehicles, which are identified, to the respective taxicab vehicles 12 they will board. The taxicab vehicles 12 form the vehicle group based on the identification information 74_4 of the representative vehicle and the subordinate vehicles.

The terminal group can be formed by the customers 100*a*, 100*b*, and 100*c* after looking at each other's faces before the customers 100*a*, 100*b*, and 100*c* board the taxicab vehicles 12A, 12B, and 12C, respectively. Consequently, the customers 100*a*, 100*b*, and 100*c* can accurately identify the persons belonging to the group. Since the configuration of this terminal group is reflected in the vehicle group in this example, it is possible to effectively prevent an unrelated taxicab vehicle 12 from accidentally entering the vehicle group.

Figure 13:
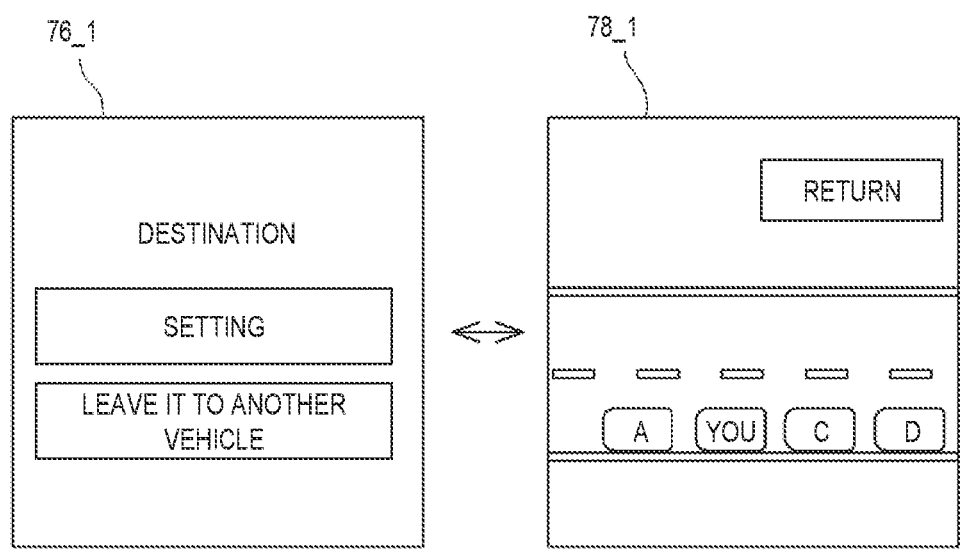
FIG. 13 is an image diagram illustrating a setting screen for setting when issuing instructions for forming the vehicle group.
Figure 14:
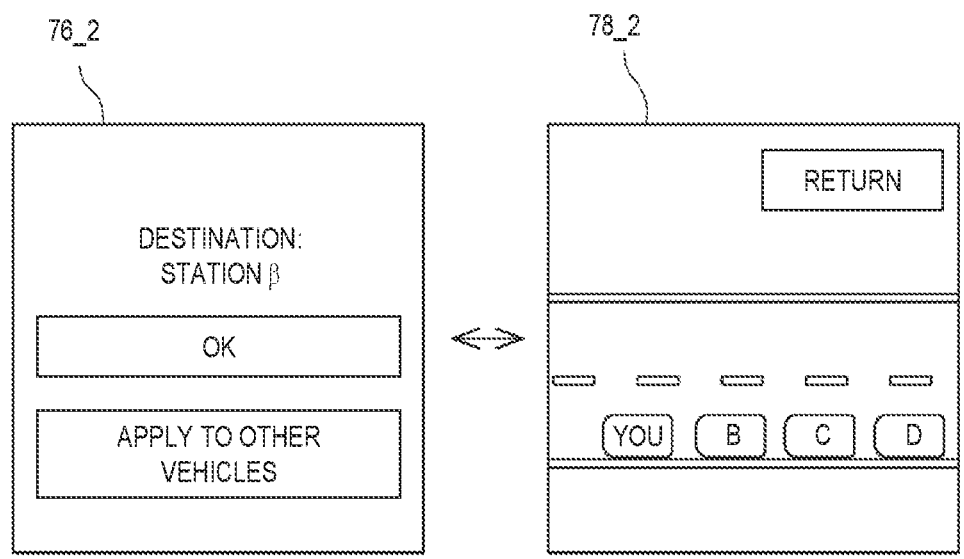
FIG. 14 is an image diagram illustrating another setting screen for setting when issuing instructions for forming the vehicle group.

Still another example of the flow of the instruction to form the vehicle group will be described. FIGS. 13 and 14 are image diagrams respectively illustrating a setting screen for setting when issuing instructions for forming the vehicle group. In an embodiment stated below, the customer 100 operates the user I/F 28 of the vehicle to issue instructions for forming the vehicle group.

A case where the customers 100*a*, 100*b*, and 100*c* respectively board the taxicab vehicles 12A, 12B, and 12C, and the taxicab vehicle 12A is set as the representative vehicle, while the taxicab vehicles 12B and 12C are set as the subordinate vehicles will be described. When the customer 100*b* boards the taxicab vehicle 12B, the customer 100*b* operates the user I/F 28 of the taxicab vehicle 12B to issue instructions for providing a service of the taxicab vehicle 12B. Upon receiving this instruction, the taxicab vehicle 12B presents a setting screen 76_1 shown in FIG. 13 to the customer 100*b*, and asks the customer 100*b* to set the destination. The setting screen 76_1 includes a "Setting" button for inputting a specific destination and a "Leave It to Another Vehicle" button for requesting that another taxicab vehicle 12 sets the destination.

When the customer 100*b* selects the "Leave It to Another Vehicle" button on the setting screen 76_1, a vehicle selection screen 78_1 is displayed. The vehicle selection screen 78_1 is a screen including a list of the other taxicab vehicles 12A and 12C, which are capable of forming the vehicle group with the taxicab vehicle 12B. The list of the other taxicab vehicles 12A and 12C may be in the form of a list in which the identification information of the taxicab vehicles 12A and 12C is arranged or, as shown in the selection screen 78_1 of FIG. 13, in a form of an image showing a relative locational relationship between the taxicab vehicle 12B and the taxicab vehicles 12A and 12C. The customer 100*b* looks at the selection screen 78_1 and selects the taxicab vehicle 12A as the taxicab vehicle that has a responsibility to set the destination, i.e., as the representative vehicle. The taxicab vehicle 12B registers the taxicab vehicle 12A selected herein as the "representative vehicle" in the vehicle group information 52. The customer 100*c* can also set the taxicab vehicle 12A as the representative vehicle by the same procedure.

On the other hand, when the setting screen 76_1 shown in FIG. 13 is presented in the taxicab vehicle 12A, the customer 100*a* selects the "Setting" button and sets a specific destination. To set this destination, the customer may enter a specific address or telephone number, or may select a point on a map. In any case, when the specific destination is input, the taxicab vehicle 12A displays a setting screen 76_2 shown in FIG. 14. The setting screen 76_2 includes an "OK" button for completing the setting and an "Apply to Other Vehicles" button for applying the set destination to the other taxicab vehicles 12B and 12C. When the customer 100*a* selects the "Apply to Other Vehicles" button, a vehicle selection screen 78_2 is displayed. The customer 100*a* looks at the selection screen 78_2 and selects the taxicab vehicles 12B and 12C as the taxicab vehicles to which the set destination is applied, i.e., as the subordinate vehicles 12B and 12C. The taxicab vehicle 12A registers the taxicab vehicles 12B and 12C selected herein as the "subordinate vehicle(s)" in the vehicle group information 52.

For the fare payment, the representative vehicle and the subordinate vehicles are set by the same procedure. As described above, the customer can issue instructions for forming the vehicle group with the user I/F 28 of the taxicab vehicle 12, thus even a customer who does not have a user terminal 16 is capable of setting the vehicle group.

Figure 15:
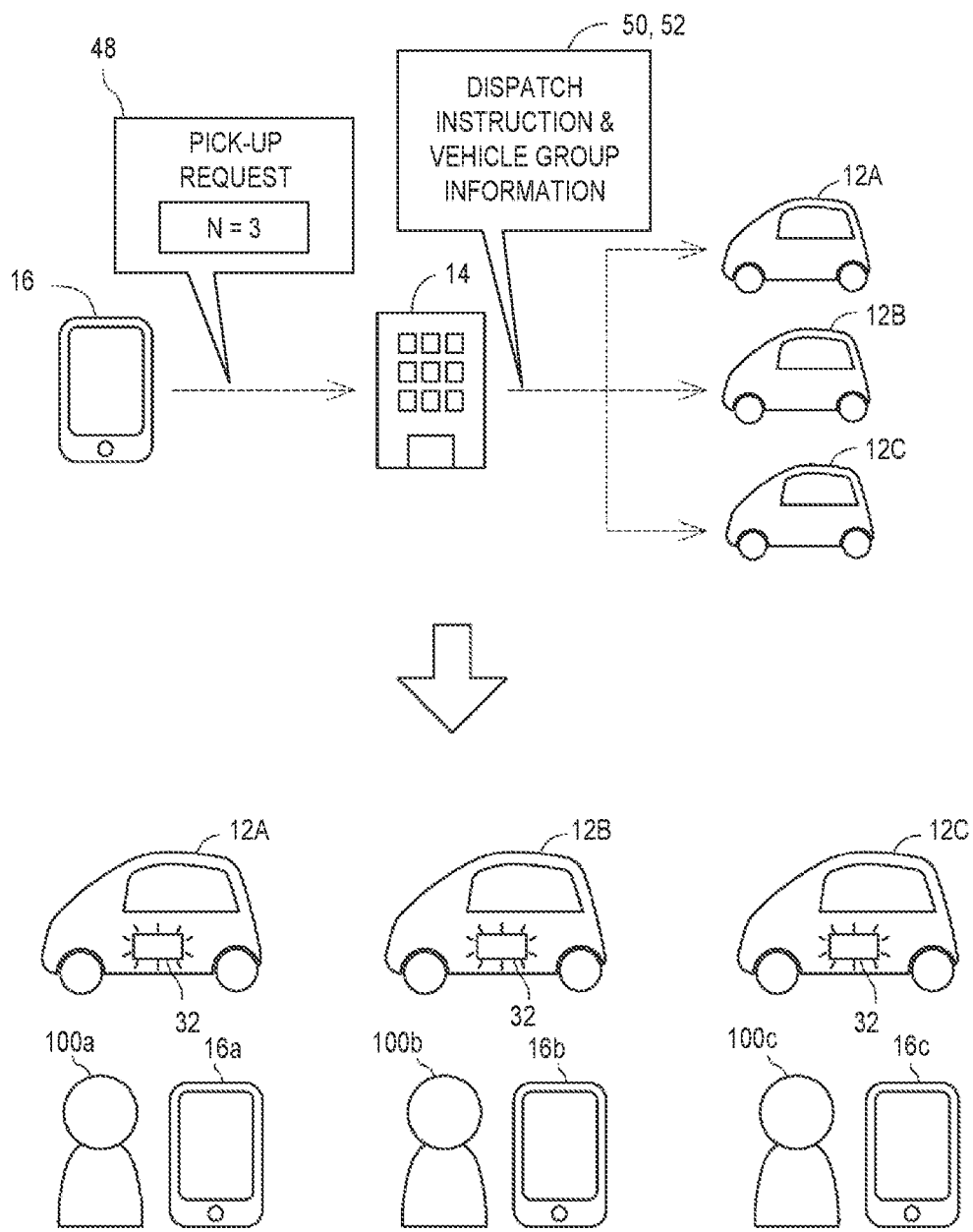
FIG. 15 is an image diagram illustrating a flow of the instruction to form the vehicle group when calling a taxicab.

A flow of the instruction to form the vehicle group when the customer calls the taxicab will be described. FIG. 15 is an image diagram illustrating the flow of the instruction to form the vehicle group when calling the taxicab. As stated above, the customer 100 operates the user terminal 16 to transmit a pick-up request 48 to the management device 14 when they call the taxicab. The pick-up request 48 includes the boarding location and the desired date/time at which the customer wants to board the taxicab vehicle 12. When it is desired that the vehicle group be formed, the customer 100 also transmits the required number N of the taxicab vehicles 12 to the management device 14. In the example of FIG. 15, N is 3. The management device 14 outputs a dispatch instruction 50 to N taxicab vehicles 12A, 12B, and 12C based on the pick-up request 48. At this time, the management device 14 also transmits, together with the dispatch instruction 50, the vehicle group information in which the taxicab vehicle 12A is set as the representative vehicle and remaining taxicab vehicles 12B and 12C are set as the subordinate vehicles, from among N taxicab vehicles 12A, 12B, and 12C. The taxicab vehicles 12A, 12B, and 12C form the vehicle group based on the received vehicle group information 52. The taxicab vehicles 12A, 12B, and 12C (the representative vehicle 12A and the subordinate vehicles 12B and 12C) move to the boarding location designated by the customer 100 based on the dispatch instruction 50.

When the representative vehicle 12A and the subordinate vehicles 12B and 12C arrive at the boarding location, the customers 100a, 100b, and 100c board the respective vehicles. At this time, the notification device 32 sends a notification to the outside of the vehicle regarding the information indicating that those vehicles are in cooperation with each other such that the customers 100a, 100b, and 100c can identify the vehicles they can board.

When the customers 100a, 100b, and 100c respectively board the representative vehicle 12A and the subordinate vehicles 12B and 12C, the representative vehicle 12A and the subordinate vehicles 12B and 12C check with the customers 100a, 100b, and 100c whether the formed vehicle group is suitable. The flow of confirmation may be the same as in the case where the customer hails the taxicab. According to the configuration above, in a case where it is desirable that the vehicle group be formed when calling the taxicab, the customer 100 only needs to specify the required number N of the taxicab vehicles 12. Consequently, the customer 100 can more easily use the taxicab vehicles 12.

Figure 16:
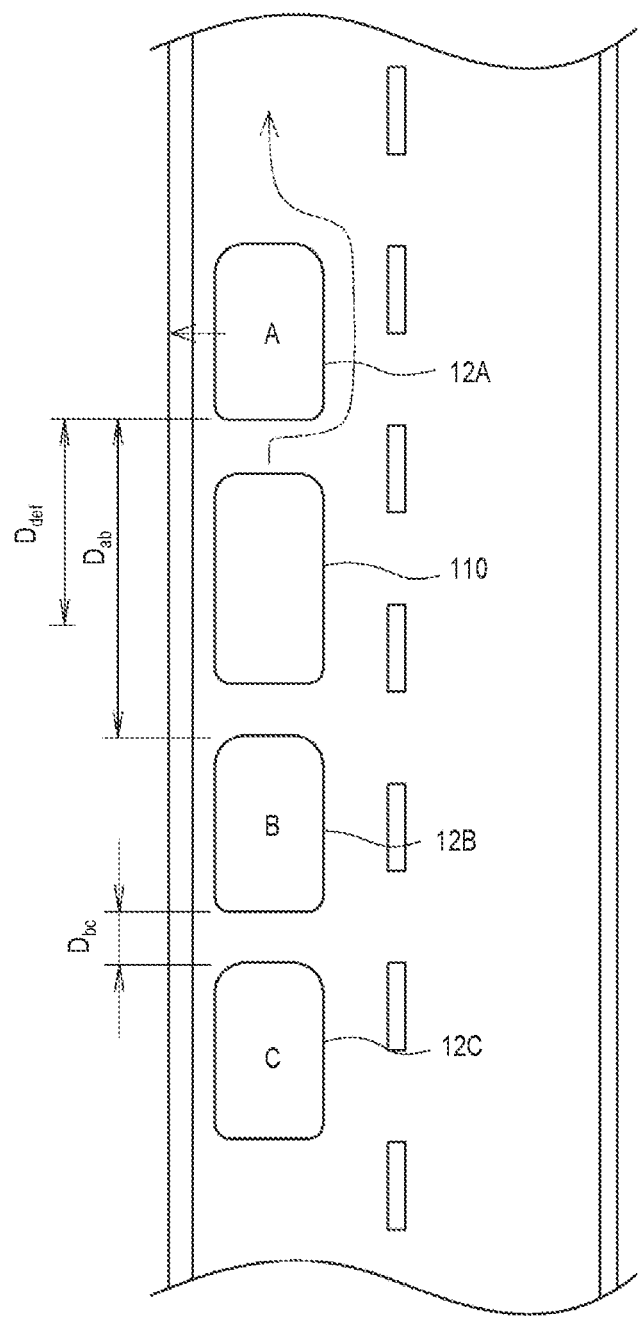
FIG. 16 is an image diagram illustrating a taxicab vehicle traveling when the collective setting process is executed.

A traveling mode of the taxicab vehicles 12 in a case where the collective setting process is executed will be described with reference to FIG. 16. FIG. 16 is an image diagram illustrating a traveling state of each taxicab vehicle 12A, 12B, and 12C when one location designated by the representative customer 100a is set as the destination of each of the representative vehicle 12A and the subordinate vehicles 12B and 12C.

In a case where the representative customer 100a and the subordinate customers 100b and 100c respectively issue instructions for executing the collective setting process, it can be assumed that the representative customer 100a and the subordinate customers 100b and 100c desire to travel to the same destination together and do not want the vehicles to excessively separate from each other. Therefore, in a case where the collective setting process is instructed to be executed, the representative vehicle 12A and the subordinate vehicles 12B and 12C run in a convoy while maintaining a formation according to a specified standard. More specifically, the representative vehicle 12A and the subordinate vehicles 12B and 12C travel in a line in a specified order. At this time, the representative vehicle 12A, or the subordinate vehicles 12B and 12C, will monitor management distances $D_{ab}$ and $D_{bc}$, which are vehicle-to-vehicle distances from the following vehicles belonging to the same vehicle group. When the management distances $D_{ab}$ and $D_{bc}$ exceed a specified reference distance $D_{def}$, the representative vehicle 12A, or the subordinate vehicles 12B and 12C, will decelerate or stop until the management distances $D_{ab}$ and $D_{bc}$ are equal to or less than the reference distance $D_{def}$.

In a case of FIG. 16, the management distance $D_{ab}$ between the representative vehicle 12A and the subordinate vehicle 12B greatly exceeds the reference distance $D_{def}$. Another vehicle 110 that does not belong to the vehicle group is inserted between the representative vehicle 12A and the subordinate vehicle 12B. In this case, the representative vehicle 12A temporarily stops to signal to the other vehicle 110 to overtake the representative vehicle 12A. When the management distance $D_{ab}$ is equal to or less than the reference distance $D_{def}$ after being overtaken by the other vehicle 110, the representative vehicle 12A travels again. The representative vehicle 12A adjusts its traveling speed such that the management distance $D_{ab}$ is maintained at the reference distance $D_{def}$ or less. Since the management distance $D_{bc}$ between the subordinate vehicle 12B and the subordinate vehicle 12C is equal to or less than the reference distance $D_{def}$, the subordinate vehicle 12B travels without any deceleration. Further, since there is no following vehicle belonging to the same vehicle group behind the subordinate vehicle 12C, the management distance thereof is not monitored. As described above, when the representative vehicle 12A and the subordinate vehicles 12B, 12C travel such that the distances between the vehicles is maintained at the reference distance $D_{def}$ or less, the customers 100a, 100b, and 100c are less likely to feel anxious about being separated.

In FIG. 16, the representative vehicle 12A is at the head, but the order of the representative vehicle 12A and the subordinate vehicles 12B and 12C in the convoy may be changed as appropriate. For example, the representative vehicle 12A may travel at the rear of the line. The order of the representative vehicle 12A and the subordinate vehicles 12B and 12C in the convoy may be determined based on the instructions of the customer 100. That is, when the vehicle group is formed, the representative vehicle 12A, or the subordinate vehicles 12B and 12C, may inquire of the customers 100a, 100b, and 100c about the traveling order of the representative vehicle 12A and the subordinate vehicles 12B and 12C.

As is clear from the description above, according to the taxicab system 10 disclosed herein, one customer 100 undertakes a responsibility to pay the fares and/or set the destination for the taxicab vehicles 12. Consequently, the customers 100 can easily use the taxicab system 10 even when several people travel to the same destination together. Further, the customers 100 can use the taxicab system 10 with improved convenience. The configuration of the taxicab system 10 described above is merely one example and may be modified as appropriate. For example, the taxicab vehicle 12 is a single-seater vehicle in the description stated above, but the taxicab vehicle 12 may be a multi-seater vehicle that can accommodate a plurality of people. The user terminal 16 is a component of the taxicab system 10 in the description stated above, but the taxicab system 10 may be configured without the user terminal 16.

What is claimed is:
1. A taxicab system comprising:
 a plurality of taxicab vehicles, each of the taxicab vehicles configured to transport a customer to a destination by automatic driving without a driver on board;
 a management device including a memory and a processor, the management device being configured to manage the plurality of taxicab vehicles; and
 a plurality of user terminals owned by a plurality of customers, wherein each of the taxicab vehicles is configured to form a vehicle group with at least one other taxicab vehicle according to an instruction from the customer or the management device, at least two taxicab vehicles forming the vehicle group are divided into one lead vehicle and at least one following vehicle, the lead vehicle and the at least one following vehicle are respectively configured to execute at least one of a collective billing process for charging a lead customer, who is using the lead vehicle, a fare for the lead vehicle and the following vehicle, and a collective setting process for setting a place designated by the lead customer as a destination of each of the lead vehicle and the following vehicle, the lead vehicle and the following vehicle are configured to, upon executing the collective setting process, travel in a convoy while maintaining a formation according to a standard, the lead vehicle and the following vehicle are configured to, in a case where a management distance that is a distance from a following vehicle belonging to the vehicle group exceeds a specified reference distance while traveling in the convoy, decelerate or stop until the management distance becomes equal to or less than the reference distance, in a case where another vehicle that does not belong to the vehicle group is between the lead vehicle and the following vehicle while the lead vehicle and the following vehicle are traveling in the convoy, the lead vehicle and the following vehicle are configured to decelerate or stop until the other vehicle is no longer present between the lead vehicle and the following vehicle the user terminals include a lead terminal and a following terminal, each of the lead terminal and the following terminal is a smartphone and a dedicated application for using the taxicab system is installed in the smartphone, the lead terminal is configured to form a terminal group with the following terminal according to an instruction from the lead customer, the lead terminal is configured to transmit, to the lead vehicle, an instruction to form the terminal group in a case where the lead customer starts traveling in the lead vehicle, and the lead vehicle is configured to form the vehicle group with the following vehicle based on the instruction from the lead terminal.

2. The taxicab system according to claim 1, wherein:
the lead vehicle is configured to accept the destination set by the lead customer and transmit the set destination to the following vehicle; and
the following vehicle is configured to set the destination of the following vehicle based on the destination received from the lead vehicle.

3. The taxicab system according to claim 1, wherein:
the following vehicle is configured to transmit a fare of the following vehicle to the lead vehicle without charging the customer of the following vehicle the fare; and
the lead vehicle is configured to charge the lead customer a sum of the fare transmitted from the following vehicle and a fare of the lead vehicle.

4. The taxicab system according to claim 1, wherein the lead vehicle is configured to, in a case where the lead customer inputs a value N as the number of vehicles in the vehicle group, instruct (N−1) following vehicles located around the lead vehicle to form the vehicle group including the lead vehicle and the (N−1) following vehicles.

5. The taxicab system according to claim 1, wherein the lead vehicle is configured to, upon receiving a request from the lead customer to form the vehicle group, present a list of a plurality of the following vehicles being available for forming the vehicle group with the lead vehicle, and form the vehicle group with the following vehicle selected by the lead customer from the list.

6. The taxicab system according to claim 1, wherein the lead vehicle is configured to, after forming the vehicle group, check suitability of the vehicle group with the lead customer who is traveling in the lead vehicle, and leave the vehicle group when the lead customer determines that the vehicle group is unsuitable.

7. The taxicab system according to claim 6, wherein the lead vehicle is configured to, when checking the suitability of the vehicle group, present in-vehicle images to the lead customer, the in-vehicle images being obtained by respectively capturing images of insides of the following vehicles belonging to the vehicle group.

8. The taxicab system according to claim 6, wherein the lead vehicle is configured to, when checking the suitability of the vehicle group, present to the customer an image showing a relative positional relationship between the lead vehicle and the following vehicle belonging to the vehicle group.

9. The taxicab system according to claim 1, wherein the lead vehicle is configured to send, to people outside of the lead vehicle, a notification regarding information indicating cooperation with the following vehicle after forming the vehicle group with following vehicle.

10. The taxicab system according to claim 1, wherein the lead vehicle and the following vehicle are configured to cancel deceleration or stopping after the other vehicle is no longer present between the lead vehicle and the following vehicle while the lead vehicle and the following vehicle are traveling in the convoy.

* * * * *